INVENTOR
DAN R. RANKIN

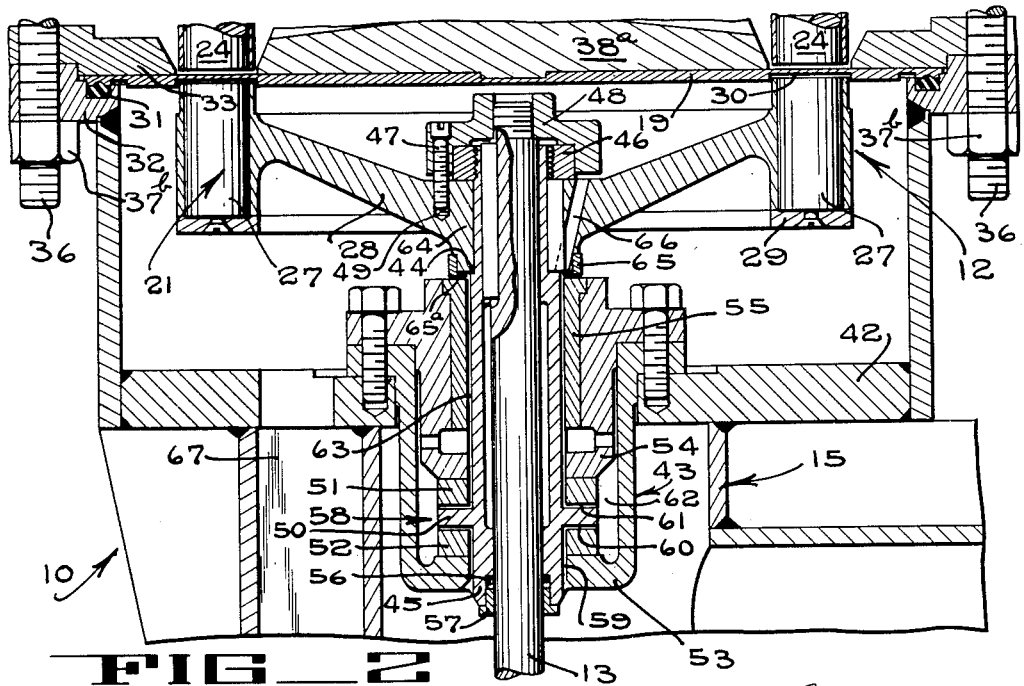

Patented May 12, 1953

2,638,558

UNITED STATES PATENT OFFICE 2,638,558

MAGNETIC POWER TRANSMISSION

Dan R. Rankin, Altadena, Calif., assignor to Food Machinery and Chemical Corporation, San Jose, Calif., a corporation of Delaware Application September 1, 1951, Serial No. 244,836

9 Claims. (Cl. 310—104)

The present invention relates to a power transmission arrangement and more particularly to a power transmission arrangement for fluid handling devices such as deep-well pumps and the like wherein the fluid impeller is situated at a distance from said transmission.

The conventional rotary pump drive comprises a rotating shaft which extends through an aperture in the stationary casing or housing of the pump. To prevent fluid leakage, some form of packing must be provided between the shaft and casing. Unless such packing is tightly compressed, leakage will occur and will be of greater magnitude in direct relation to increased fluid pressures developed within the pump. However, if in an attempt to eliminate such leakage, the packing is very tightly compressed, excessive frictional losses result and a sizeable decrease of power is incurred.

As a consequence, in those instances wherein leakage or power loss has proved of serious detriment, it has become an alternate practice to employ a magnetic power transmission arrangement which eliminates the described shaft and packing construction. Such an arrangement may comprise a plurality of driving and driven magnets supported for rotation in corresponding ring-like configurations on opposite sides of a stationary member which is impervious to fluid flow.

Although such a diaphragm is preferably constructed of a material which is non-magnetic and has a low magnetic eddy current loss, the revolution of the driving and driven magnets generates a considerable amount of heat therein, which is liable to warp and may eventually even rupture the diaphragm. In close-coupled pump installations, this problem finds its natural solution in the fact that the driven magnets are usually supported on the pump rotor or impeller within the pump bowl which exposes the diaphragm to the cooling action of the fluid that passes through the pump. However, as previously indicated, the present invention is more particularly related to pumps, such as the deep-well variety wherein the pump rotor and bowl are not situated proximately with respect to the diaphragm.

It is an object of the present invention to provide a magnetic power transmission arrangement of the type referred to wherein the diaphragm separating the driven from the driving magnets is effectively protected from deterioration due to overheating whether it is situated close to or remote from the pump impeller.

Another object is to provide in conjunction with a power transmission of the type referred to and wherein the pump impeller is situated remotely from the diaphragm, means for protecting said diaphragm against deformation or deterioration due to heating.

It is a further object to provide a power transmission of the magnetic type wherein adequate cooling is provided for the portions of the structure which become heated during operation.

These and other objects will be made apparent from the following description and the accompanying drawings wherein:

Fig. 2 is an enlarged sectional view of a portion of the structure shown in Fig. 1.

Fig. 3 is a sectional view similar to Fig. 2, illustrating a modified embodiment of the invention.

Figure 1:
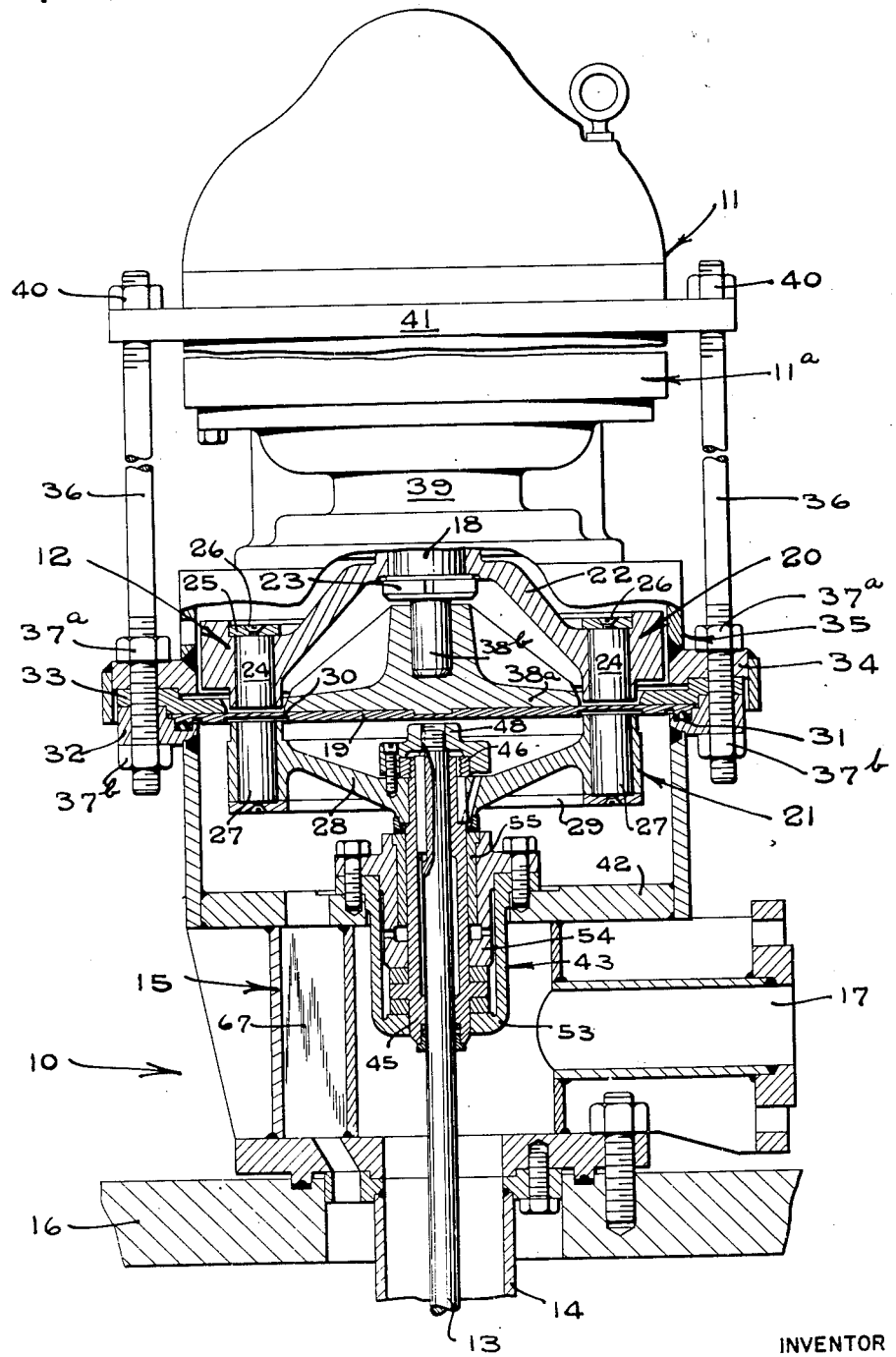
Fig. 1 is a fragmentary elevational view of a deep-well pump which incorporates the present invention, parts being shown in section.

With particular reference to Fig. 1, a deep-well pump 10 is illustrated as energized by a motor 11 through a magnetic drive arrangement which is generally indicated by the numeral 12.

The deep-well pump 10 includes an operating shaft 13 coaxially disposed within a vertically extending tubular casing 14. A pump impeller (not shown) is mounted at the lower end of the pump shaft 13 to deliver liquid upwardly through the casing 14, which forms the outlet conduit of the pump 10. The casing 14 terminates within a substantially cylindrical housing 15 which rests on a base plate 16 and is provided with a lateral discharge opening 17 for liquid delivered by the pump through the described casing into the housing.

To operate the pump shaft 13, the motor 11 is suitably supported above the cylindrical housing 15 with its shaft 18 in vertical axial alignment with the pump shaft. Power is transmitted from the motor shaft to the pump shaft without permitting fluid leakage from the pump 10 by providing a circular diaphragm 19 which covers the open upper end of the cylindrical housing 15 and which is interposed between magnetic coupling elements 20 and 21 supported respectively from the axially opposed ends of the motor and pump shafts.

The driving element 20 comprises an arched and centrally apertured disc 22 which is secured to the lower threaded end of the motor shaft 18 by a lock nut 23. A number of bar magnets 24 are received within circumferentially spaced holes provided in the disc 22 to extend substantially parallel to the axis of the motor shaft. The bar magnets 24 are in contact with an annular plate 25 which rests on the disc 22 and is connected to the upper ends of the bar magnets by screws 26. This annular plate 25 is preferably constructed of a ferrous material so that a flux path between adjacent magnets 24 will be provided.

The lower ends of the bar magnets 24 are closely adjacent the upper surface of the aforementioned diaphragm 19 and upon rotation of the motor shaft, describe an annular orbit thereabove. A similar annular orbit is described immediately beneath the diaphragm within the cylindrical housing 15 by a number of bar magnets 27 which form the hereinbefore mentioned driven magnet coupling element 21. These driven magnets 27 are similar to the drive magnets 24 and are similarly supported on a disc 28 connected to the pump shaft 13 for rotation therewith. As in the case of the drive magnets 24, the driven magnets 27 rest upon, and are secured to an annular plate 29 of ferrous material which provides a flux path between adjacent magnets.

From the foregoing it will be apparent that upon energization of the motor 11, torque will be transmitted from the motor shaft to the pump shaft 13 through the driving and driven magnetic coupling elements 20 and 21 supported on those shafts, respectively. To provide a high degree of coupling between the coupling elements 20, 21, the diaphragm 19 interposed therebetween is formed by a relatively thin circular sheet of stainless steel. To maximize the coupling, the gap between the driving and driven magnets may be further reduced by providing an annular recess 30 on the lower side of the diaphragm 19 in registration with the orbit described by the driven magnets 27.

When the pump 10 is in operation, as above described, the interior of the cylindrical housing 15 is subject to the fluid pressure developed thereby. Consequently, a gasket 31 is provided on a flange or lip 32 arranged on the upper end of the housing 15 to sealingly seat the diaphragm 19. A ring 33 overlies the periphery of the diaphragm 19, and seated on the ring 33 is the flange portion 34 of an annular guard member 35 which surrounds the magnetic drive element 20. A plurality of threaded bars 36 extend through the lip 32 of the housing 15, the ring 33 and the flange 34 so that respective pairs of nuts 37a, 37b on said bars 36 may connect the three members and simultaneously clamp the diaphragm 19 in sealing engagement with the gasket 31.

To support the diaphragm 19 against excessive fluid pressure from within the pump housing 15, a back-up plate 38a may be arranged to bear against the upper surface of said diaphragm as shown in Figs. 1 and 2. Said plate 38a may be secured to the lower end of a vertical bar 38b that extends upwardly through the motor shaft 18, which is of tubular construction for this purpose, and said vertical bar 38b in turn may be suitably supported from the motor frame above its rotor (not shown).

A member 39 resembling an hour-glass is secured to the upper end of the guard member 35 and surrounds the motor shaft. Said member 39 is bolted to the frame 11a of the motor to support the motor 11 in the desired axially aligned position relative to the pump 10. To additionally tie the motor 11 to the pump 10, the previously described bars 36 are extended so that their upper ends may be secured by nuts 40 to a circular plate 41 which forms a portion of the motor frame 11a.

Since the motor 11 and pump 10 are rigidly secured in axial alignment by the described support member 39 and the tie bars 36, the shafts of the motor and pump may not become misaligned.

To secure the shafts against axial displacement and thus maintain the desired gap between the coupling elements 20, 21 thereon, each shaft is supported by anti-thrust bearings. Such a bearing (not shown) for the motor shaft is secured within the motor support member 39. The anti-thrust bearing 43 for the pump shaft 13 is supported in a central partition 42 which divides the cylindrical housing 15 of the pump 10.

When the pump is in operation, as previously described, the thin diaphragm 19 interposed between the drive and driven magnetic elements 20, 21 becomes heated due to the production of eddy currents therein. In accordance with the invention the magnet-support disc 28 and the mentioned anti-thrust bearing 43 on the pump shaft 13 are therefore arranged so that a portion of the liquid discharged by the pump 10 into the cylindrical housing 15 may be directed to the under surface of the diaphragm 19 to effect continuous heat transfer therefrom.

As clearly shown in Fig. 2, the hub 64 of the magnet support disc 28 rests upon a shoulder 44 formed on a tubular spindle 45 which surrounds, and is keyed to the pump shaft 13 for rotation therewith. The disc hub 64 is secured on the shoulder by a lock nut 46 and is precluded from rotation relative to the spindle 45 by a machine screw 47 which passes eccentrically through a dome nut 48 on the pump shaft 13 to enter a suitable hole 49 in the disc 28.

The described spindle 45 is provided with an exterior circular flange 50 which is rotatably supported between two ring bearings 51, 52. To support the ring bearings 51, 52, a cup-like bearing cartridge 53 and a sleeve 54 adapted to telescope thereinto are bolted at their upper ends to the central partition 42 in the housing 15 and clamp the ring bearings 51, 52 against the top and bottom surfaces of the spindle flange 50, whereby the spindle 45 is restrained against axial movement. An additional bearing 55 of the conventional radial type is disposed within the mentioned sleeve 54 to engage the spindle 45 above the described ring bearings 51, 52.

A counterbore at the lower end of the spindle 45 receives an O-ring packing 56 and a packing gland 57 is provided to maintain the O-ring 56 in position so that fluid may not pass between the pump shaft 13 and the lower portion of the spindle 45.

In accordance with the invention, I provide for the passage of fluid from the lower portion of the cylindrical housing 15 beneath its partition 42 upwardly through the bearing structure 43 to supply coolant for the diaphragm 19. For this purpose, a fluid passage 58 is formed through the bearing structure 43. Having specific reference to Fig. 2, said passage comprises an annular axially extending channel 59 between the spindle 45 and the bottom portion of the cup-shaped bearing cartridge 53, radial channels 60 and 61 formed by grooves in the ring bearings 51 and 52, an annular axially extending channel 62 which connects said radial channels, and a final annular axially extending channel 63 between the radial bearing 55 and the exterior of the spindle 45.

The described fluid passage 58 terminates immediately beneath the hub portion 64 of the magnet-supporting disc 28. An annular ring 65 having an inwardly turned flange 65a is supported from the hub portion 64 of the disc 28 to direct fluid discharged from the bearing passage 58 into a plurality of bores 66 diverging upwardly through the hub portion 64 of the disc 28 and leading into the space between the disc 28 and the diaphragm 19.

The fluid is passed through the bearing passage 58 as a result of pressure developed by the pump. Added pressure is obtained when the fluid traverses the bores 66 in the disc 28, as a result of centrifugal impetus provided by the rotation of the disc 28 and the divergent disposition of these bores. Thus, the fluid moves quickly into engagement with the undersurface of the diaphragm 19 and passes outwardly in proximity thereto. After moving between the diaphragm 19 and the rotating magnets 27, the fluid moves downwardly to discharge through an eccentrically disposed outlet 67 which communicates with a sump or other low pressure repository (not shown).

From the above, it will be apparent that a constant and positive flow of coolant is directed over substantially the entire lower surface of the circular diaphragm 19 during operation of the device. The fluid passage 58 through the bearing structure 43 and the divergent bores 66 in the hub portion 64 of the disc 28 are of such dimensions that a more than adequate supply of coolant is afforded. Thus, the deleterious effects which would otherwise result from the heating of the diaphragm by the magnetic flux are eliminated. It is thus possible to apply magnetic transmissions in a comparatively inexpensive and simple manner to those fluid handling devices wherein the fluid impeller is remote from said drive. No exterior or separate source of coolant need be supplied, and but few structural additions and re-arrangements are requisite.

A modified form of the invention may be seen in Fig. 3. In this embodiment the packing 56 between the lower end of the spindle 45 and the pump shaft 13 is eliminated and an axially extending annular channel 68 is provided between these two members. A radial bore 69 in the shaft communicates the upper end of said channel 68 with a second channel 70 formed axially within the shaft 13 and extending to its upper end. This modified form of fluid passage accordingly passes fluid interiorly of the bearing surfaces and discharges directly against the center of the diaphragm 19. Radial passages 71 may be provided through the spindle 45 to supply fluid from this passage to lubricate the bearing surfaces.

While I have described my invention as embodied in a particular magnetic power transmission wherein the driving and driven magnets are arranged in superposed relation and which incorporates a flat circular sealing member or diaphragm 19, it will be appreciated that the principles of my invention may readily be applied to other types of well known magnetic transmissions such as those wherein the driving and driven magnets are arranged in concentric relation and the interposed diaphragm is accordingly of substantially cylindrical form.

Therefore, I do not wish to be limited to the particular embodiment herein described in detail, but give reference instead to the appended claims which properly indicate the scope of the present invention.

I claim:

1. In a fluid handling device of the class described, a magnetic power transmission arrangement comprising a plurality of driving and driven magnets rotatably supported in cooperating relationship, a member impervious to fluid flow disposed between said driving and said driven magnets, means separating said impervious member from the high pressure side of said fluid handling device, and means including a fluid passage in communication with the high pressure side of the fluid handling device and terminating adjacent said impervious member for discharging fluid against said member to effect cooling thereof during operation of the fluid handling device.

2. In a fluid handling device of the class described wherein the fluid impeller is mounted upon a rotatable elongated shaft, a power transmission arrangement comprising a chamber in which the elongated shaft terminates, a circular disc mounted on the shaft within said chamber for rotation with said shaft about the axis of said shaft, a plurality of driven magnets supported adjacent the edge of said disc in proximity with a wall of said chamber, a plurality of driving magnets rotatably supported on the opposite side of said chamber wall in cooperating relationship with said driven magnets whereby torque may be transmitted to the shaft, said magnet supporting disc having a passage extending therethrough from one side to the opposite side thereof, and means for guiding fluid to said passage whereby said fluid is transmitted through said passage to impinge upon said chamber wall at point centrally of the annular path described by the rotation of said driven magnets.

3. Power transmission arrangement for a deep-well pump comprising a chamber in which the elongated shaft of the pump terminates, said chamber having a wall in the form of a diaphragm of non-magnetic material, cooperating magnetic means disposed within and without said chamber or opposite sides of said diaphragm for transmitting torque to the pump shaft, means separating said chamber from the high pressure side of said pump, and means for supplying fluid from the high pressure side of the pump to said chamber to cool said diaphragm.

4. Power transmission arrangement for a deep-well pump comprising a chamber surrounding the free end of the pump shaft and having an open end, a diaphragm of non-magnetic material arranged to close the open end of said chamber, means for rotatably supporting the shaft, a circular disc secured to the free end of the shaft, a plurality of driven magnets supported on said disc adjacent said diaphragm for rotation with the shaft, a plurality of drive magnets disposed without said chamber on the opposite side of said diaphragm and arranged to cooperate with said driven magnets to transmit torque to said rotatably supported shaft, means separating said chamber from the high pressure side of said pump, and means including a fluid passage formed in said disc for communicating the high pressure side of the deep-well pump with said diaphragm whereby fluid will be directed against said diaphragm to cool the same.

5. In a fluid handling device of the class described wherein the fluid impeller is mounted on an elongated shaft, a magnetic power transmission arrangement comprising a plurality of drive and driven magnets arranged in cooperating relationship to transmit power to the shaft, an open-ended chamber surrounding said driven magnets, a diaphragm arranged to close the open end of said chamber and separate said driven magnets from said drive magnets, bearing means secured to a wall of said chamber and rotatably supporting the shaft within said chamber, and means including a fluid passage through said bearing means in communication with the high pressure side of the fluid handling device for directing fluid against said diaphragm during operation of the fluid handling device.

6. A power transmission arrangement for a deep-well pump comprising a pump shaft, a circular disc secured to the free end of said shaft, a plurality of driven magnets supported on the periphery of said disc, an open-ended chamber surrounding the free end of said shaft, said disc and said driven magnets, a plurality of drive magnets disposed without said chamber in cooperative relationship with said driven magnets to transmit torque to said pump shaft, a diaphragm arranged to close the open end of said chamber and separate said driven magnets from said drive magnets, bearing means secured to the wall of said chamber for rotatably supporting said shaft, and means including channels through said bearing means and said disc for passing fluid from the high pressure side of said deep-well pump into contact with the inner side of said diaphragm.

7. A power transmission arrangement for a deep-well pump comprising a rotatably mounted pump shaft, a circular disc secured to the free end of said shaft, a plurality of driven magnets supported on the periphery of said disc, an open-ended chamber surrounding the free end of said shaft, said disc and said driven magnets, a plurality of drive magnets disposed without said chamber in cooperative relationship with said driven magnets to transmit torque to said pump shaft, a diaphragm arranged to close the open end of said chamber and separate said driven magnets from said drive magnets, and means including a channel extending axially through said shaft for passing fluid from the high pressure side of said deep-well pump into contact with the inner side of said diaphragm.

8. In a fluid handling device of the class described wherein the fluid impeller is mounted upon an elongated shaft, a power transmission arrangement comprising a chamber in which the elongated shaft terminates, a circular disc mounted on the shaft within said chamber, a plurality of driven magnets supported adjacent the edge of said disc in proximity with a wall of said chamber, a plurality of driving magnets rotatably supported on the opposite side of said chamber wall in cooperating relationship with said driven magnets whereby torque may be transmitted to the shaft, said magnet supporting disc having a passage extending therethrough from one side to the opposite side thereof, and means for guiding fluid to said passage whereby said fluid is transmitted through said passage to impinge upon said chamber wall at points centrally of the annular path described by the rotation of said driven magnets, said passage diverging relative to the axis of rotation in the direction of said chamber wall, whereby centrifugal impetus is added to the fluid passing therethrough.

9. Power transmission arrangement for a deep-well pump comprising a chamber in which the elongated shaft of the pump terminates, said chamber having a wall in the form of a diaphragm of non-magnetic material, cooperating magnetic means disposed within and without said chamber on opposite sides of said diaphragm for transmitting torque to the pump shaft, and means for supplying fluid from the high pressure side of the pump to said chamber to cool said diaphragm, said fluid supply means including a passage formed within the pump shaft and terminating at a point in proximity to said diaphragm.

DAN R. RANKIN.

References Cited in the file of this patent

UNITED STATES PATENTS

| Number | Name | Date |
|---|---|---|
| 2,353,740 | Malone | July 18, 1944 |
| 2,399,856 | Coger | May 7, 1946 |
| 2,429,114 | Whitted | Oct. 14, 1947 |
| 2,481,172 | Staggs | Sept. 6, 1949 |